Figure 1:
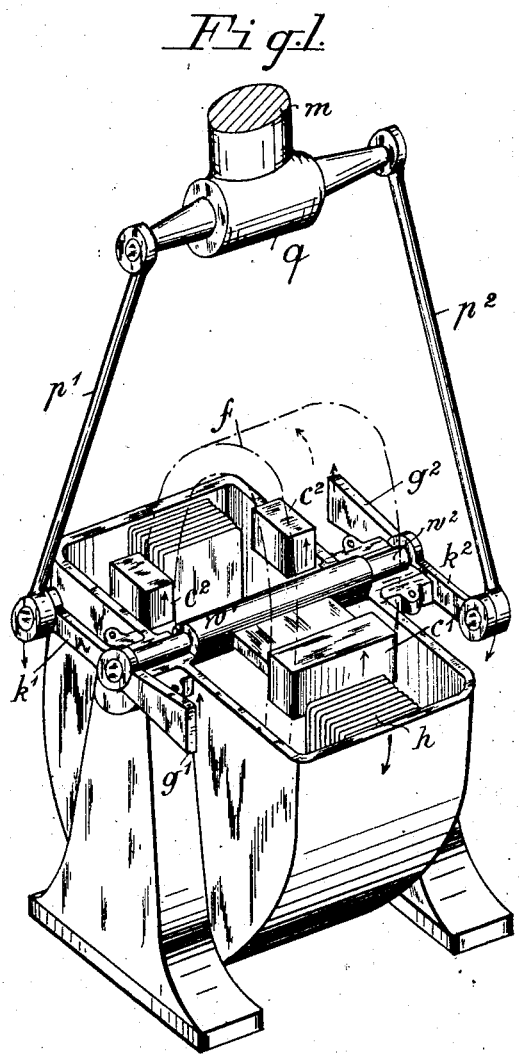

F. B. K. SCHUBERT.
BALANCING TWO CRANK ENGINES.
APPLICATION FILED AUG. 5, 1911.

1,027,775.

Patented May 28, 1912.

2 SHEETS—SHEET 1.

Witnesses:
K. O'Hara
A. H. Smith

Inventor:
F. B. K. Schubert.
by his attorney
Lawrence Langner.

F. B. K. SCHUBERT.
BALANCING TWO CRANK ENGINES.
APPLICATION FILED AUG. 5, 1911.
1,027,775.
Patented May 28, 1912.
2 SHEETS—SHEET 2.
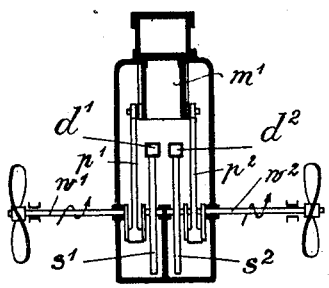
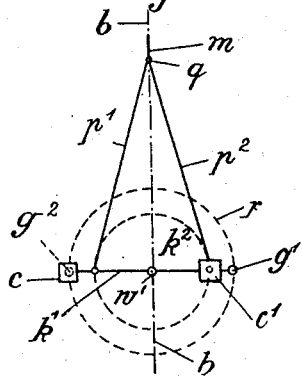
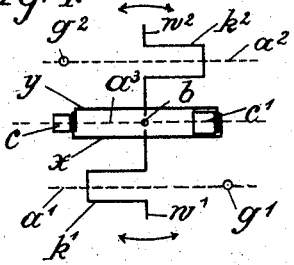
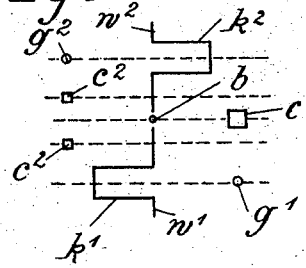
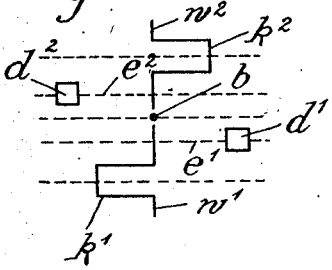
Witnesses:
K. O'Hara.
A. A. Smith
Inventor:
F. B. K. Schubert
by his Attorney
Lawrence Langner.

UNITED STATES PATENT OFFICE.

FRANZ BERNHARD KARL SCHUBERT, OF HAMBURG, GERMANY, ASSIGNOR TO COMPANY OF DESENISS & JACOBI ACTIENGESELLSCHAFT, OF HAMBURG, GERMANY.

BALANCING TWO-CRANK ENGINES.

1,027,775.

Specification of Letters Patent.  Patented May 28, 1912.

Application filed August 5, 1911. Serial No. 642,577.

*To all whom it may concern:*

Be it known that I, FRANZ BERNHARD KARL SCHUBERT, a subject of the German Emperor, residing at 63 Hammerlandstrasse, Hamburg, in the German Empire, have invented certain new and useful Improvements in Balancing Two-Crank Engines, of which the following is a specification.

An endeavor has hitherto been made in connection with single cylinder engines to balance the forces of inertia by causing the piston to act by means of a cross head or the like on two connecting rods mounted on two co-axial oppositely running crank shafts which are provided with rotating counterweights. If the counterweights are suitably selected this arrangement permits of balancing both of the moments of the rotating masses and the moments of the reciprocating masses, as these counterweights furnish or engender forces which completely counterbalance those due to the inertia of the rotating masses of the cranks and of the lower connecting rod ends, and which by their resultant in the direction of the axis of the piston correspond to the reciprocating masses, while the resultant of the said engendered forces perpendicularly to the axis of the piston are always equal and opposite. This known method of balancing as applied to single cylinder engines does not, however, take into account the moment which is produced by the fact that the planes of the cranks or connecting rods and consequently those of the counterweights are located at an interval or distance apart one from the other. These moments, the lever-arm or magnitude of which is determined by the distance of the counterweights, are however unbalanced in this known arrangement and act as rolling moments in a plane passing through the axis of the crank shaft perpendicularly to the axis of the piston as they tend to rock the crank to and fro in this plane, that is to say, to rotate them on the axis of the piston. Although these rolling moments have not hitherto been neutralized this is effected according to the present invention with the result that a complete or approximately complete balancing of the entire machine is effected in the manner hereinafter described with reference to the accompanying sheets of drawings in which—

Figure 1 is a perspective view of an electric motor constructed in accordance with the present invention to drive the piston of a single-cylinder engine; Fig. 2 represents a vertical sectional diagrammatic view of a balanced explosion motor; Fig. 3 is a diagrammatic view representing in end elevation a balanced engine of the kind in question; Fig. 4 is a plan of Fig. 3; and Figs. 5 and 6 are similar views as Fig. 4 showing modified arrangements of the counterweights.

Similar letters of reference refer to like parts throughout the figures.

The invention can best be explained with reference to the diagrammatic views Fig. 3 and 4 of which Fig. 3 represents in end elevation an engine of the kind in question that it is desired to balance with its cranks horizontal and Fig. 4 shows the two crank shafts of this engine in plan. In these illustrations $m$ indicates the piston of the single cylinder engine which is connected by a cross-head $q$ and the two connecting rods $p'$ and $p^2$ to the cranks $k'$ and $k^2$ of the two coaxial oppositely running shafts $w'$ and $w^2$. The dotted line $b$ (Fig. 3) or the point $b$ (Fig. 4) represents the axis of the piston. In order to balance the moments of the rotating masses a counterweight $g'$ or $g^2$ corresponding to the moment of the rotating masses is arranged as nearly as possible in the plane $a'$ or $a^2$ of the cranks or connecting rods opposite each of the cranks $k'$ and $k^2$. For balancing the reciprocating masses there are also arranged opposite the cranks but in the central plane $a^3$ passing through the axis $b$ of the piston (Fig. 4) additional counterweights $c$ and $c'$ by means of two disks $x$ and $y$ running one within the other; these counterweights present equal moments corresponding to half the reciprocating masses. It will readily be understood that the centrifugal forces of these two counterweights invariably engender a resultant in the direction of the axis of the piston which is equal and opposite to the inertia of the piston and so forth while the resultants of both centrifugal forces in the plane perpendicular to the axis of the piston mutually neutralize each other in each crank position so that an oscillation or rocking of the crank shafts around the axis $b$ of the piston in the direction of the arrows indicated in Fig. 4 is prevented. From the arrangement of "balancing rotating masses on each crank in their plane independently" and of "neutralizing reciprocating masses by rotating counterweights arranged opposite the cranks in the central plane of the engine as a whole", therefore results a mathematically complete balancing effect if each connecting rod be considered as consisting of two ends with a connecting rod the mass of which may be neglected; this assumption which departs but little from the actual facts greatly simplifies the matter.

In practice it is frequently impossible to arrange the counterweights $c$ and $c'$ in one and the same plane, that is to say the central plane of the engine. In this case, either the one or the other of these counterweights may be divided into two weights $c^2$, $c^2$ (Fig. 5) and arranged in planes located to the right and left of the central plane in such a manner that the ideal sum of these two smaller counterweights rotates or acts in the central plane of the engine.

The four counterweights (Fig. 4) or the five counterweights (Fig. 5) can also be combined to form two counterweights, that is to say the two counterweights belonging to each crank shaft can be combined to form a single counterweight as the weights $g'$ and $g^2$ (Figs. 4 and 5) serving for balancing the rotating masses and the weights $c$ and $c'$, or $c'$ and $c^2$, $c^2$ respectively, necessary for balancing the reciprocating masses are located opposite the corresponding cranks at an angle of 180° in the same radial plane $r$ (Fig. 3). This combination of the weights $g'$ and $c'$ and $g^2$ and $c$ (Fig. 4) or $g^2$ and $c^2$ $c^2$ (Fig. 5) furnishes two counterweights $d'$ and $d^a$ (Fig. 6) each of which is equal to the sum of the weights $g'$ and $c'$ and $g^2$ and $c$ or $g^2$ and $c^2$ $c^2$ respectively. These weights $d'$ and $d^2$ are not located either in the planes of the cranks or in the central plane of the engine but in intermediate planes $e'$ and $e^2$ (Fig. 6) the distance between which and the central plane is determined in such a manner that the moment of the combined weight $d'$ or $d^2$ is equal to the sum of the moments of the weights $g'$ $c'$ or $g^2$ $c$ or $g^2$ $c^2$ $c^2$ to be replaced. Owing to the fact that the balancing weights $d'$ $d^2$ are located laterally of the central plane of the engine they leave room for a central bearing in which the two crank shafts $w'$ and $w^2$ can be supported.

A practical embodiment of the invention is illustrated in Fig. 1 as applied to a vertical engine of the kind referred to. This arrangement shows in perspective an electric motor driving the piston $m$ of a single-cylinder engine through two cranks $k'$ and $k^2$, two connecting rods $p'$ and $p^2$ and a cross head $q$. The armature shaft $w'$ of the armature $f$ which rotates in a counter-clockwise direction carries one crank $k'$ while the magnet ring $h$ rotating in a clockwise direction forms one piece with the other shaft $w^2$ and crank $k^2$. For the sake of clearness in Fig. 1 the upper part of the rotating magnet ring is omitted and the armature shown in dotted lines. The counterweights $g'$ and $g^2$ arranged opposite the cranks are the balancing weights for the rotating masses. The masses moving upward and downward including the rolling or rocking moments in a plane perpendicularly to the piston-axis are balanced by a counterweight $c'$ arranged opposite the crank $k'$ in the armature and by two counterweights $c^2$ $c^2$ arranged opposite the crank $k^2$ on the magnet ring in accordance with the diagrammatic view Fig. 5.

Fig. 2 represents a balanced explosion motor in which also two co-axially arranged crank shafts rotate in opposite directions and are moved upward and downward by means of connecting rods actuated by a common piston $m'$. The counterweights $d'$ and $d^2$ which are two in number as shown diagrammatically in Fig. 6, are here attached to two flywheels $s'$ and $s^2$ arranged in proximity to the central plane of the engine. As already stated in explaining Fig. 6 these counterweights are equal to the sum of the rotating and reciprocating masses to be balanced and are located at such distance from the central plane of the engine as corresponds to the proportion of the two masses which is ascertainable from a comparison of their moments.

In the two engines illustrated in Figs. 1 and 2 a complete balancing effect for practical purposes is obtained.

I claim:

In an engine, in combination with a single cylinder, of two pitmen and two cranks on two concentric independently and oppositely rotatable shafts adapted to be engaged by said pitman rods, a balance weight for each crank adapted to balance the rotating and reciprocating parts and arranged between the longitudinal axis of the cylinder and the central plane of rotation of that crank which it is to balance, said combined balance weights being so weighted and at such a distance from the longitudinal axis of the cylinder that the rolling moments produced by the said balance weights are equal to the rolling moments produced by the rotating parts.

In testimony whereof I affix my signature in presence of two witnesses.

FRANZ BERNHARD KARL SCHUBERT.

Witnesses:
MAX A. G. LEMCKE,
ERNEST H. L. MUMMENHOFF.